United States Patent
Burga et al.

(10) Patent No.: US 6,338,269 B1
(45) Date of Patent: Jan. 15, 2002

(54) GLIDE HEAD WITH SIDE MOUNTED TRANSDUCER

(75) Inventors: Margelus A. Burga, Santa Clara; Alexander A. Burga, San Jose, both of CA (US)

(73) Assignee: Marburg Technologies, Inc., Milpitas, CA (US)

( * ) Notice: Subject to any disclaimer, the term of this patent is extended or adjusted under 35 U.S.C. 154(b) by 0 days.

(21) Appl. No.: 09/522,244

(22) Filed: Mar. 9, 2000

(51) Int. Cl.$^7$ .................................................. G01B 5/28
(52) U.S. Cl. ........................................................ 73/105
(58) Field of Search ........................................... 73/105

(56) References Cited

U.S. PATENT DOCUMENTS

| | | | |
|---|---|---|---|
| 3,956,771 A | * | 5/1976 | Barnes et al. ................ 360/127 |
| 5,808,184 A | * | 9/1998 | Boutaghou et al. ........... 73/105 |
| 5,817,931 A | * | 10/1998 | Boutaghou ................... 73/105 |
| 5,872,311 A | * | 2/1999 | Schaenzer et al. ............ 73/105 |
| 5,939,624 A | | 8/1999 | Smith, Jr. |
| 5,942,680 A | * | 8/1999 | Boutaghou ................... 73/105 |
| 6,016,692 A | * | 1/2000 | Schaenzer et al. ............ 73/105 |
| 6,071,007 A | * | 6/2000 | Schaenzer et al. ............ 73/105 |

* cited by examiner

*Primary Examiner*—Daniel S. Larkin
(74) *Attorney, Agent, or Firm*—Skjerven Morrill MacPherson LLP; Norman R. Klivans; Michael J. Halbert

(57) ABSTRACT

A glide head includes a transducer mounted on a side surface, e.g., the leading side, as opposed to the top surface of the glide head slider. Thus, a suspension arm may be mounted to the top surface of a small glide head slider, e.g., thirty percent, without interference from the transducer. The glide head slider may include a notch or groove on the side surface into which the transducer is at least partially inserted to assist in securely mounting the transducer to the glide head slider. The height of the glide head slider is increased to accommodate the thickness of the notch, and thus, the glide head slider may have a height to length ratio of forty percent or greater. For example, a thirty percent glide head slider may have a height to length ratio of approximately seventy percent. The transducer is laterally mounted to the side surface of the glide head slider such that an axis between the collectors of the transducer is horizontally oriented. Laterally mounting the transducer to the side surface of the glide head slider prevents wires extending from the collectors from undesirably and uncontrollably extending above or below the top or bottom surfaces of the glide head slider.

14 Claims, 6 Drawing Sheets

GLIDE HEAD WITH SIDE MOUNTED TRANSDUCER

FIELD OF THE INVENTION

This invention relates to glide heads used to detect defects on the surface of magnetic or magnetic-optical memory disks such as those used in hard disk drives.

BACKGROUND

A computer hard disk drive comprises a memory disk mounted on a spindle which is driven by a motor to rotate the disk at high speed. A read/write head, kept in close proximity to the surface of the rotating disk, reads or writes data on the disk, which may be a magnetic or magneto-optic disk. The read/write head is separated from the surface of the disk by an air bearing created by the high speed rotation of the disk. The read/write head flies on this air bearing, e.g., at a height of approximately $1\mu''$ (one microinch) above the surface of the disk. The density of the information written on the disk is increased as the read/write head flies closer to the surface of the disk. Thus, it is desirable for the read/write head to fly as close as possible to the surface of the magnetic disk.

Typical memory disks comprise, e.g., an aluminum substrate that is plated with a hard material, such as a nickel phosphorus alloy. The nickel phosphorus is then textured or roughened. An underlayer, a magnetic alloy or magnetic-optical material, and a protective overcoat are then deposited on the nickel phosphorus, e.g., by sputtering. The disk manufacturing process leaves the surface of the disk in a slightly roughened condition. Although magnetic disks are typically textured to have a specified roughness, there has been a trend in the industry to make magnetic disks smoother and smoother. Presently, some magnetic disks are specified to have a roughness less than or equal to about 30 Å (3 nm).

The precision with which the read/write head flies over the magnetic disk requires that care is taken during manufacturing to assure that there are no protrusions or asperities on the disk surface that may interfere with the read/write head. A protrusion on the surface of the disk that contacts the read/write head during use may damage the head or the disk.

Accordingly, tests are performed on finished disks using media certifiers to determine if there are any asperities, voids, or contamination that might interfere with the read/write head. Accurate testing of disks for such defects assures that the disk manufacturer does not unnecessarily reject good quality disks or pass on poor quality disks that may later fail.

Glide heads are used in conjunction with media certifiers to detect the asperities and depressions. Glide heads are similar to read/write heads in that it includes a slider which rests or flys on the air bearing formed by the rotating disk. A transducer is mounted on the glide head. If the glide head collides with a defect on the rotating disk, e.g. an asperity, the mechanical shock from the collision with the defect will cause the transducer to create an electrical signal, which is received by a circuit in the media certifier via wires. This circuit identifies signals caused by collisions between glide head and defects. The larger the defect, the larger the electrical signal created by the transducer and sensed by the circuit within the media certifier.

In general, glide heads, like read/write heads, have continued to decrease in size over time. For example, glide heads, and sliders in general, decreased in size to 70% sliders (the percentage describes the size of the glide head relative to the original slider size, which is known as 100%) to the now industry standard 50% glide heads. An original 100% slider has a length of 0.16 inches, a width of 0.125 inches, and a height of 0.034 inches. The suspension arms to which glide heads are mounted, however, have not had a corresponding reduction in size.

FIGS. 1 and 2 show bottom and front views, respectively, of a conventional 50% glide head 10. Glide head 10 includes a slider 12 that has two rails 14 and 16 with respective tapered leading ends 15 and 17. Glide head 10 also includes a wing 18 that serves as an extension to the slider 12.

FIG. 2 shows a suspension arm 20 mounted to the top surface of slider 12 and a transducer 22 mounted to the top surface of wing 18. The suspension arm 20 positions glide head 10 over the disk as it rotates while glide head 10 tests the disk for defects. Transducer 22 is conventionally a piezoelectric transducer and is used to convert the mechanical energy that is created by glide head 10 physically contacting an asperity on the surface of the disk to an electric signal. Other types of transducers may also be used.

Glide head 10 is called a 50% glide head because slider 12 is approximately 50% the size of an original 100% glide head. As is well understood in the art, however, with wing 18 serving as an extension to slider 12, the overall width of glide head 10, including slider 12 and wing 18, is approximately the same as an original 100%. A 50% glide head has, e.g., a length $L_{10}$ of approximately 0.080 inches, a total width $W_{TOT10}$ of approximately 0.10 inches (with slider 12 width $W_{12}$ approximately 0.060 inches, and wing width $W_{18}$ approximately 0.040 inches), and a height $H_{10}$ of approximately 0.024 inches.

FIG. 3 shows a top view of suspension arm 20 mounted to the top surface of glide head 10. It should be understood that while FIG. 3 shows a top view of suspension arm 20, glide head 10 is shown in its entirety, i.e., slider 12 is shown unobscured, for the sake of clarity. As can be seen in FIG. 3, the width of slider 12 is approximately the same as the width $W_{20}$ of suspension arm 20, which is approximately 0.070 inches. With larger glide heads, i.e., 100% and 70% glide heads, the slider portion was large enough that the suspension arm 20 did not cover the entire top surface of the slider. Consequently, the transducer could be mounted to the top surface of the glide head slider without interfering with the suspension arm. However, as shown in FIG. 3, with a 50% glide head, the slider 12 is approximately the same size as the suspension arm 20, leaving no room to mount a transducer. Thus, wing 18 is used as an extension to slider 12 and extends the top surface of glide head out from under the suspension arm 20. Consequently, transducer 22 can be mounted on wing 18 without interfering with suspension arm 20.

The next reduction in size for glide heads will be 30%, i.e., the glide head slider is 30% of the 100% slider. FIG. 4 is a perspective view of a conventional 30% slider 30. Slider 30 includes two rails 32 and 34 with tapered leading ends 33 and 35, respectively. A conventional slider 30 has dimensions that are approximately 30% of a 100% slider, e.g., a length $L_{30}$ of approximately 0.048 inches, a width $W_{30}$ of approximately 0.038 inches, and a height $H_{30}$ of approximately 0.010 inches.

Because the size of suspension arms have not had a decrease in size corresponding to the decrease in the size of sliders, 30% slider 30 will be much smaller than a suspension arm, leaving no room for a transducer to be mounted to slider 30. Thus, like the 50% glide head 10, shown in FIG.

3, a transducer cannot be mounted to the top surface of a 30% glide head without the presence of a wing that extends beyond the suspension arm.

FIG. 5 shows a top view of suspension arm 20 mounted to the top surface of a 30% glide head 40, which includes slider 30 and a wing 36 that extends from slider 30. As shown in FIG. 5, wing 36 extends beyond suspension arm 20 by an amount sufficient for transducer 22 to be mounted to wing 36 without interfering with suspension arm 20. FIG. 5, similar to FIG. 3, shows slider 30 in its entirety, i.e., unobscured by the suspension arm 20, for the sake of clarity. Because wing 36 is required to extend beyond suspension arm 20 and to provide a large enough surface to mount transducer 22, the wing 36 of glide head 40 is much larger than slider 30. Consequently, wing 36 will alter the flight characteristics of glide head 40. For example, the mass of wing 36 will provide torque on slider 30 causing slider 30 to roll during flight. Further, because wing 36 has a large surface area, wing 36 may alter the lift characteristics of the glide head and may cause undesirable vibrations. Thus, a conventional wing configuration with a small, e.g., thirty percent, glide head slider has certain disadvantages.

Another configuration that could be used with a 30% slider is to mount the transducer on suspension arm 20, rather than on the slider itself. For example, the transducer may be mounted at the end 21 of suspension arm 20. With the transducer mounted to the end of the suspension arm, there is no need for a wing to extend the top surface of slider 30. Unfortunately, a transducer mounted on suspension arm 20 will not directly receive vibrations from slider 30 when slider 30 contacts defects on the surface of a disk, but rather must receive the vibrations through the junction of slider 30 and suspension arm 20. Unfortunately, with the transducer separated from the slider, only low frequency vibrations will be detected by the transducer. Consequently, such a configuration results in the loss of higher frequencies, which sometimes provide the most valuable information.

Thus, what is needed is a glide head to which a transducer can be directly mounted without interfering with the suspension arm. This is particularly desirable where the glide head is smaller in size than the width of the suspension arm.

SUMMARY

In accordance with an embodiment of the present invention, a glide head that is used for testing disk substrates for defects includes a transducer mounted on a side surface, e.g., the leading side, of the glide head slider. With the transducer mounted on a side surface of the glide head slider, as opposed to being conventionally mounted on a top surface or on a wing of the glide head, a suspension arm may be mounted to the top surface of a small glide head slider, e.g., a thirty percent slider, without interference from the transducer. The side surface of the glide head slider may include a notch or a groove into which at least a portion of the transducer is inserted to securely mount the transducer to the glide head slider. The notch may be positioned approximately midway between the top surface and the bottom surface of the glide head slider and may extend across the entire side surface, i.e., from one side to the opposing side of the glide head slider. The height of the glide head slider may be increased to accommodate the presence of the transducer without permitting the transducer to extend above or below the top or bottom surfaces of the glide head slider. With the increased height of the glide head slider, the glide head slider may have a height to length ratio of greater than forty percent. For example, for a 30% glide head slider, the height to length ratio may be seventy percent.

The transducer that is mounted to the side surface of the glide head slider may be, e.g., a piezoelectric transducer that includes a first collector and a second collector and piezoelectric material disposed between. The piezoelectric transducer may be mounted with one of the collectors against the glide head slider body, which improves the operation of the transducer. The transducer may be laterally mounted, i.e., with an axis between the collectors horizontally oriented, which prevents wires extending from the collectors from unintentionally extending above or below the top or bottom surfaces of the glide head slider. Thus, the suspension arm may be mounted to the top surface of the glide head slider and the transducer does not contact or interfere with the suspension arm.

The glide head may be manufactured by providing a substrate that is cut into slices, each slice having a top surface, a bottom surface, and four sides. A plurality of grooves may be produced in the top surface of the substrate prior to cutting out slices. Once the slice is cut out, the groove is located on one of the sides of the slice. Rails are produced on the bottom surface of the slice, e.g., after the top surface is mounted to a transfer tool to hold the slice. Individual glide head sliders are then cut out of the slice and a transducer is mounted to one of the sides, e.g., the leading side of the glide head slider. The transducer is mounted to the side of the glide head slider by inserting at least a portion of the transducer into the groove. A suspension arm can then be mounted to the top surface of the glide head slider without interference from the transducer.

DETAILED DESCRIPTION

A glide head in accordance with an embodiment of the present invention includes a transducer mounted on a side surface, e.g., the leading, trailing, left or right side, of the glide head slider. With a side mounted transducer, the glide head does not need a wing to extend the top surface of the slider and the suspension arm may be mounted to the top surface of the glide head slider without interference from the transducer. Further, the transducer is advantageously mounted directly to the glide head so that there is no loss of desirable frequencies.

Figure 1:
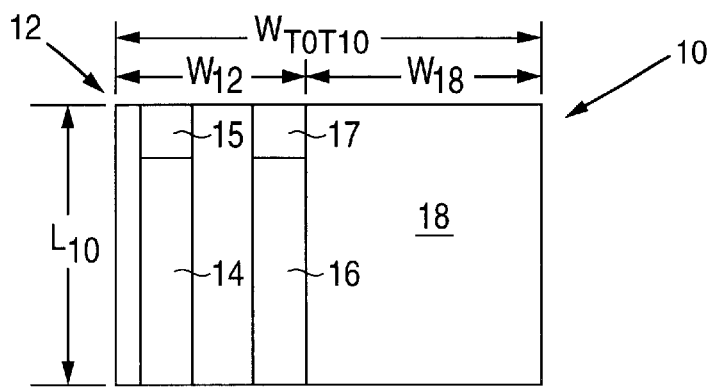
FIGS. 1 and 2 show bottom and front views, respectively, of a conventional 50% glide head with a wing that acts as an extension of the glide head slider.
Figure 2:
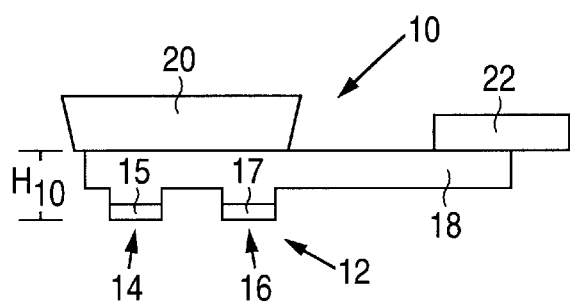
Figure 3:
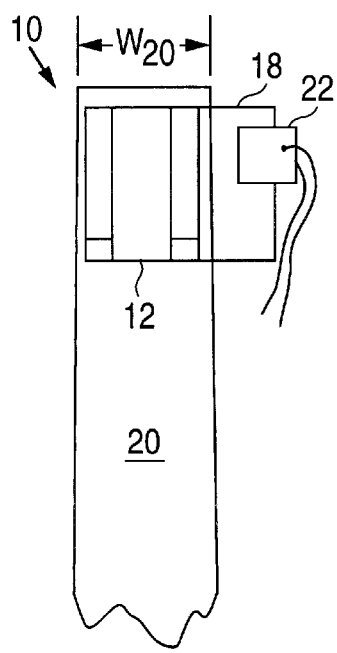
FIG. 3 shows a top view of a suspension arm mounted to a 50% glide head with a wing.
Figure 5:
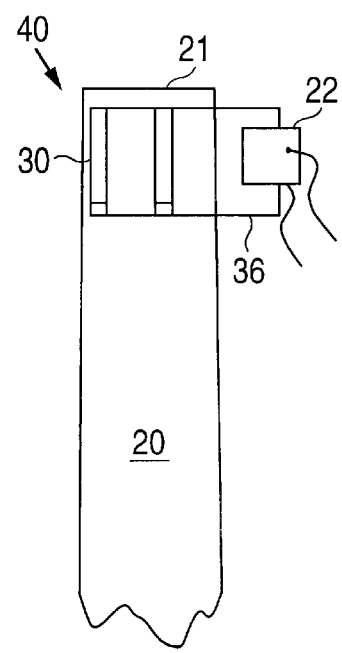
FIG. 5 shows a top view of a suspension arm mounted to the top surface of a 30% glide head with a wing that acts as an extension of the glide head slider.
Figure 4:
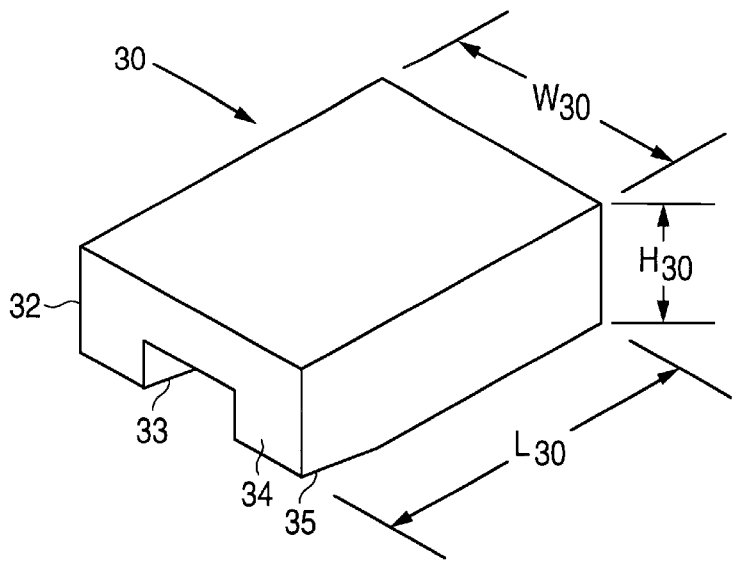
FIG. 4 is a perspective view of a conventional 30% slider.
Figure 6:
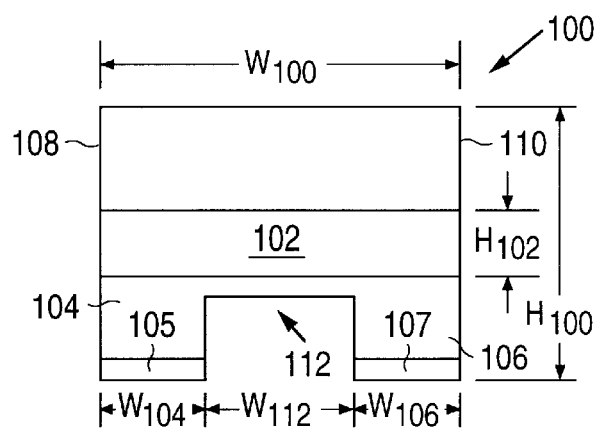
FIGS. 6 and 7 show respective front and side views of glide head that includes a notch in a side in which a transducer may be mounted in accordance with an embodiment of the present invention.
Figure 7:
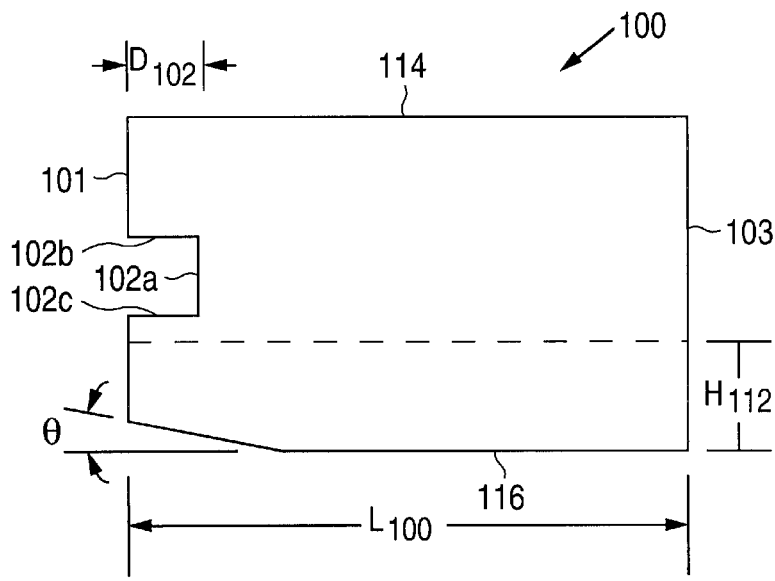

FIGS. 6 and 7 show respective front and side views of glide head slider 100 that includes a notch 102 in a side in which a transducer may be mounted in accordance with an embodiment of the present invention. Glide head 100 also includes two rails 104 and 106 with tapered leading ends 105 and 107, respectively. As shown in FIGS. 6 and 7, glide head 100 need not include a wing because the transducer is mounted on the side of glide head 100. While notch 102 is shown located on the leading side 101 of glide head 100, it should be understood that notch 102 may be located on any side of glide head, including the trailing side 103, the right side 108, or the left side 110.

Glide head 100 is, for example, a 30% glide head, i.e., 30% of the size of an original 100% slider. The height of glide head 100, however, is larger than found in a conventional 30% slider. The additional height of glide head 100 advantageously permits a transducer to be mounted on the side of glide head 100 without extending above the top surface 114 (which would interfere with a suspension arm mounted to glide head 100) or the bottom surface 116 (which would interfere with the flight of glide head 100 and possibly damage the disk being tested). While glide head 100 is actually a modified 30% glide head due to the increased height, glide head 100 will be referred to as simply 30% glide head, for the sake of simplicity. It should be understood that glide head 100, however, may be any sized glide head, i.e., larger or smaller than 30%.

Glide head 100 may have a length $L_{100}$ of approximately 0.048 inches, a width of $W_{100}$ of 0.038 inches, and a height $H_{100}$ of 0.034 inches, which is almost three times the height of a conventional 30% slider. Notch 102 has a height $H_{102}$ of approximately 0.024 inches and a depth $D_{102}$ of approximately 0.002 inches. However, the height and depth of notch 102 may be altered as desired, for example, to accommodate different sizes or different types of transducers. The leading end tapers 105 and 107 of rails 104 and 106, respectively, may have a taper angle θ of approximately fifty minutes from horizontal. The width of rails 104 and 106 depends on the fly height requirements and the rotational velocity of the disk being tested. By way of example, with glide head 100 flying at one microinch at a slope of 0.03 degrees over a disk, and the disk rotates beneath glide head 100 such that the portion of the disk under glide head 100 travels at five hundred inches per second, the rails 104 and 106 may be widths $W_{104}$ and $W_{106}$ of approximately 0.009 inches. Rails 104 and 106, however, may have any dimensions and shape to achieve the desired fly height. The channel 112 that is formed between rails 104 and 106 has a width $W_{112}$ of approximately 0.020 inches and has a height $H_{112}$ of approximately 0.002 inches.

The ratio of the height to the length of a glide head in accordance with an embodiment of the present invention is forty percent or greater. Thus, for example, a 30% glide head, as described above has a height to length ratio or approximately seventy percent. If the present invention were used with a 50% glide head having a height of 0.034 inches to accommodate the thickness of the transducer and a length of a conventional 50% glide head of approximately 0.08 inches, the height to length ratio will be slightly greater than forty percent. Conventional glide heads, on the other hand, have a height to length ratio of approximately twenty to thirty percent.

It should be understood, however, that all dimensions are merely by way of example, and the present invention is not limited to a glide head having these particular dimension. Further, the size and configuration of rails 104 and 106, as well as the number of rails, may be altered in any way, such as that described in U.S. Pat. No. 5,963,396, which is incorporated herein by reference.

Figure 8:
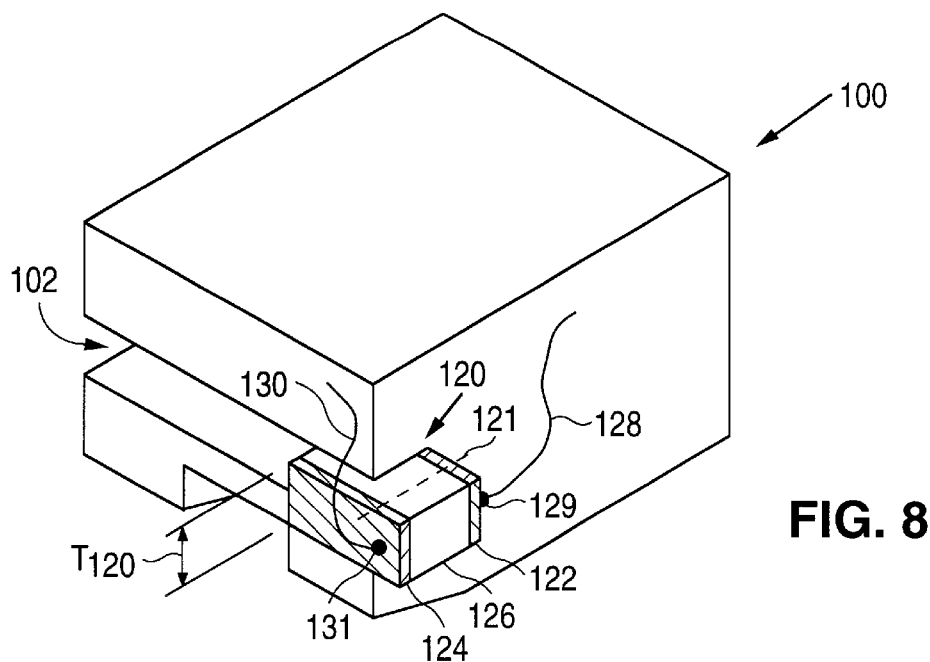
FIG. 8 shows a perspective view of glide head having a transducer mounted to the side of the glide head in a notch in accordance with an embodiment of the present invention.

FIG. 8 shows a perspective view of glide head 100 having a transducer 120 mounted on the side in notch 102 in accordance with an embodiment of the present invention. As shown in FIG. 8, transducer 120 includes two collectors 122, 124, which may be, e.g., silver, with a piezoelectric crystal 126 disposed therebetween. In one embodiment, piezoelectric crystal 126 is a lead zirconate titanate ceramic ("PZT"). However, other materials exhibit piezoelectric properties, e.g. materials having an asymmetric crystal lattice such as lithium niobate, $BaTiO_3$, $PbZrO_3$, $PbTiO_3$, and other ferroelectric materials. Transducer 120 can be a type II part number PZT5A, available from Seacor Piezo Ceramics, located in Branford, Conn., or a similar part from Morgan Matroc, Inc., located in Bedford, Ohio. Wires 128 and 130 are attached to collectors 122, 124, respectively, with solder contacts 129 and 131 and are used to connect collectors 122, 124 to an electronic circuit within the media certifier (not shown). The height $H_{102}$ of notch 102 should be sufficiently large to accommodate the thickness $T_{120}$ of transducer 120. Transducer 120 is mounted in notch 102 using an epoxy, such as type No. 409, manufactured by Loctite Corporation, located in Rocky Hill, Conn., or other appropriate bonding material.

As shown in FIG. 8, transducer 120 is laterally mounted to the side of the body of glide head 100, i.e., the axis 121 from collector 122 to collector 124 is oriented horizontally with respect to glide head 100, such that collector 122 is in contact with the inside wall 102a of notch 102, as opposed to the upper wall 102b or lower wall 102c (as shown in FIG. 7). By laterally mounting transducer 120, the performance of transducer 120 is improved because collector 122 is in physical contact with the body of glide head 100. Further, because transducer 120 is horizontal, wires 128 and 130 extend horizontally from collectors 122 and 124. Advantageously, the horizontal extension of wires 128, 130 prevents wires 128, 130 from unintentionally extending above the top surface 114 or below the bottom surface 116 of glide head. If transducer 120 were mounted in a vertical position, the lowest wire would extend below the bottom surface 116 of glide head 100, which would interfere with the flight of glide head 100 and possibly contact and damage the surface of the disk being tested. Horizontally extending wires 128 and 130 can be led to the suspension arm (not shown in FIG. 8) and run along suspension arm to the electronic circuit in the media certifier.

As discussed above, because notch 102 must accommodate the thickness $T_{120}$ of transducer 120, the height $H_{100}$ of glide head 100 has an increased height $H_{100}$ of approximately 0.034 inches. With notch 102 approximately centered in the height of glide head 100 midway between the top surface and the bottom surface, there will be approximately 0.007 inches below and above notch 102. However, if desired, notch 102 need not be centered in glide head 100, and may be at the top surface of the glide head 100, such that there is approximately 0.014 inches below notch 102. In this embodiment, however, care must be taken that transducer 120 does not extend above the top surface of glide head 100 which would interfere with the suspension arm.

Figure 9:
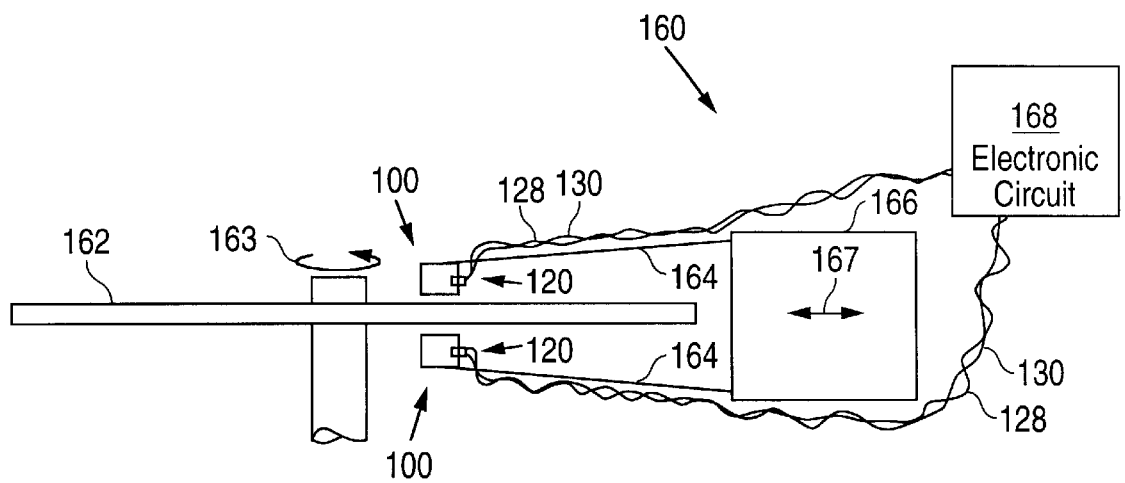
FIG. 9 shows a media certifier with glide heads having side mounted transducers flying above and below the respective top and bottom surfaces of a disk being tested.

As discussed above, the height of glide head 100 may be much greater than a conventional 30% glide head so that glide head 100 may accommodate notch 102 it the side. Because glide head 100 does not operate under the same constraints as a read/write head, the increased size will not interfere with the operation of glide head 100. FIG. 9 shows a media certifier 160 with glide heads 100 mounted above and below the respective top and bottom surfaces of a disk 162 being tested. As can be seen in FIG. 9, the top and bottom glide heads 100 are mounted on suspension arms 164 which are moved by e.g., a linear actuator 166, as indicated by arrow 167, while disk 162 is rotated as indicated by arrow 163. Wires 128 and 130 from transducer 120 are coupled to the electronic circuit schematically shown as block 168 within media certifier 160. In one embodiment, the media certifier 160 can be device model No. MSA950, available from Cambrian (Phase Metrics) Corporation located in California. However, other types of certifiers can be used as well. As can be seen, media certifier 160 tests one disk at a time, and thus, there is no space limitation that requires a glide head 100 to be a particular height.

Figure 10:
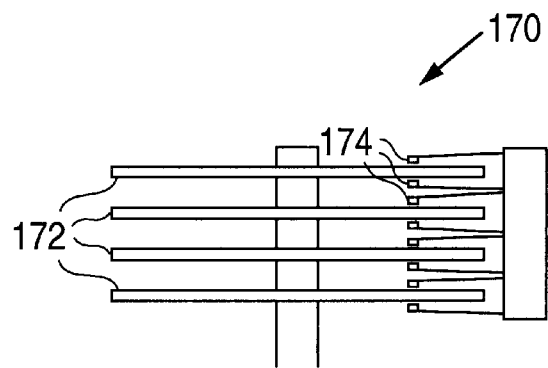
FIG. 10 shows a hard disk drive with a plurality of disks and a plurality of read/write heads flying over the top and bottom surfaces of disks.

By way of comparison, FIG. 10 shows a hard disk drive 170 with a plurality of disks 172 and a plurality of read/write heads 174 flying over the top and bottom surfaces of disks 152. Because multiple disks 172 are used in a hard disk drive 170, the spaces between disks 172 are minimized to reduce the overall size of the hard disk drive 170. Consequently, often read/write heads will have a strict height requirement. Thus, read/write heads may not have the extended height to accommodate a notch in which to place a transducer. As shown in FIG. 9, however, media certifiers do not have a strict height requirement, and thus, glide head 100 may have additional height to accommodate notch 102.

Figure 11:
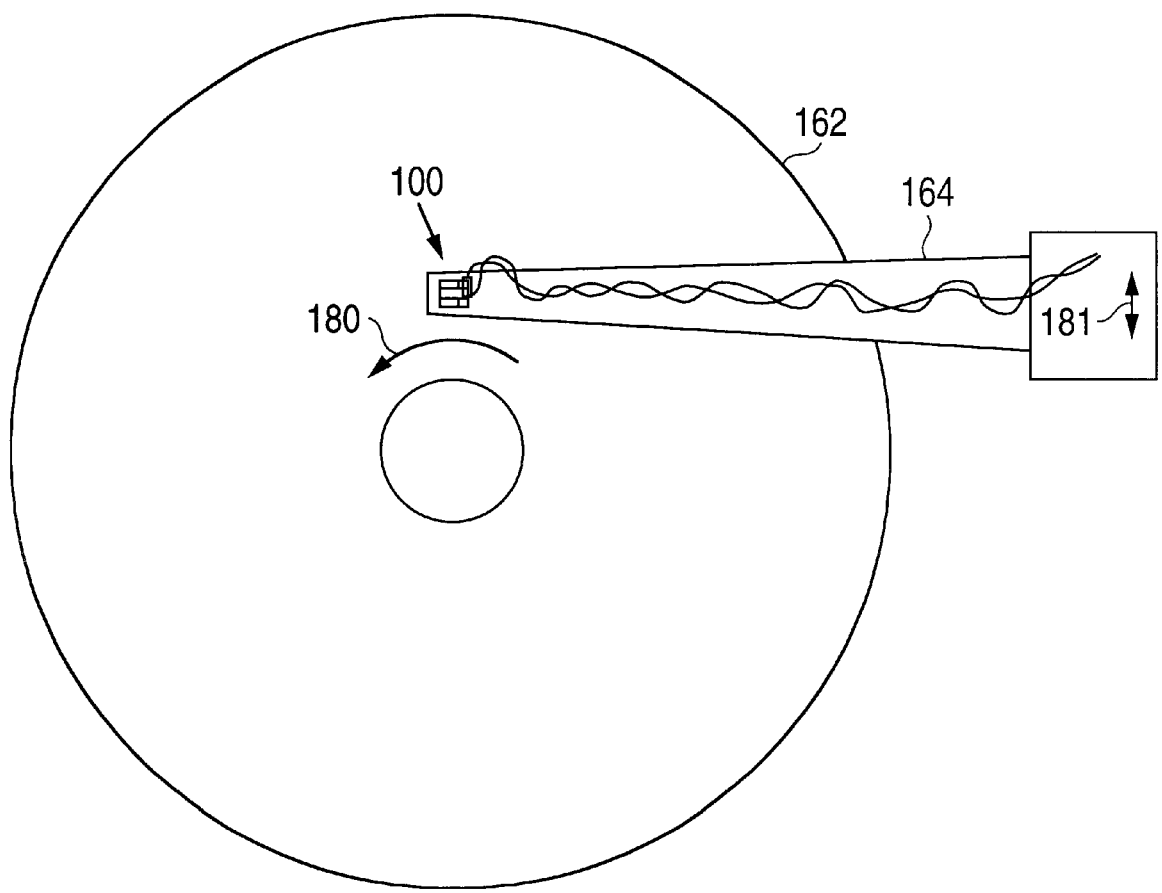
FIG. 11 shows a top view of a rotating disk with a glide head in accordance with the present invention mounted to a suspension arm and flying over the surface of the disk.

FIG. 11 shows a top view of disk 162 rotating as indicated by arrow 180 with glide head 100 mounted to suspension arm 164 and flying over the surface of disk 162. Glide head 100 is shown unobscured by suspension arm 164 for the sake of clarity. Suspension arm 164 moves in a linear direction, as indicated by arrow 181, such that glide head 100 can move radially from the outside diameter to the inside diameter of disk 162 while disk 162 rotates. Suspension arm 164 may be, for example, such as type 2, 4, 13, 18.50, or 19 manufactured by Magnecom, Inc., located in San Diego, Calif.

Figure 12:
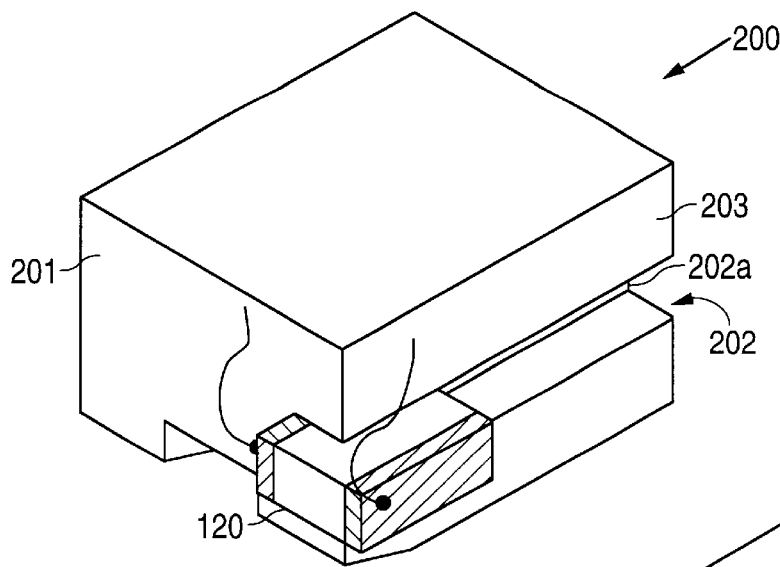
FIG. 12 shows a perspective view of a glide head in accordance with another embodiment of the present invention.

FIG. 12 shows a perspective view of a glide head 200 in accordance with another embodiment of the present invention. As shown in FIG. 12, glide head 200 is similar to glide head 100, shown in FIGS. 6 and 7, and includes a notch 202 in the side of glide head 200. Notch 202, however, is located on the left side 203 of glide head 200 as opposed to the leading side 201. Of course, if desired, notch might be located on the right side if desired. Glide head 200 includes transducer 120 mounted in notch 202 with collector 122 in contact with the inside wall 202a of notch 202.

In other embodiments, notch 102 may be located in the trailing side 103 of glide head 100. It should be understood, however, that the presence of notch 102 in glide head 100 may cause some deflection of the bottom surface of glide head 100. By locating notch 102 at the leading side 101 of glide head, any deflection of the bottom surface may be compensated for by the tapering of the leading ends of rails 104 and 106. In fact, it is believed that any deflection caused by the presence of notch 102 will be much smaller than the taper on rails 104 and 106, e.g., the deflection may amount to only 7% of the amount of taper on rails. However, deflection at the trailing end or at the right or left sides of the glide head may alter the flatness of the bottom surface of the glide head (including the rails) and, thus, affect the flight characteristics or operation of the glide head.

Figure 13:
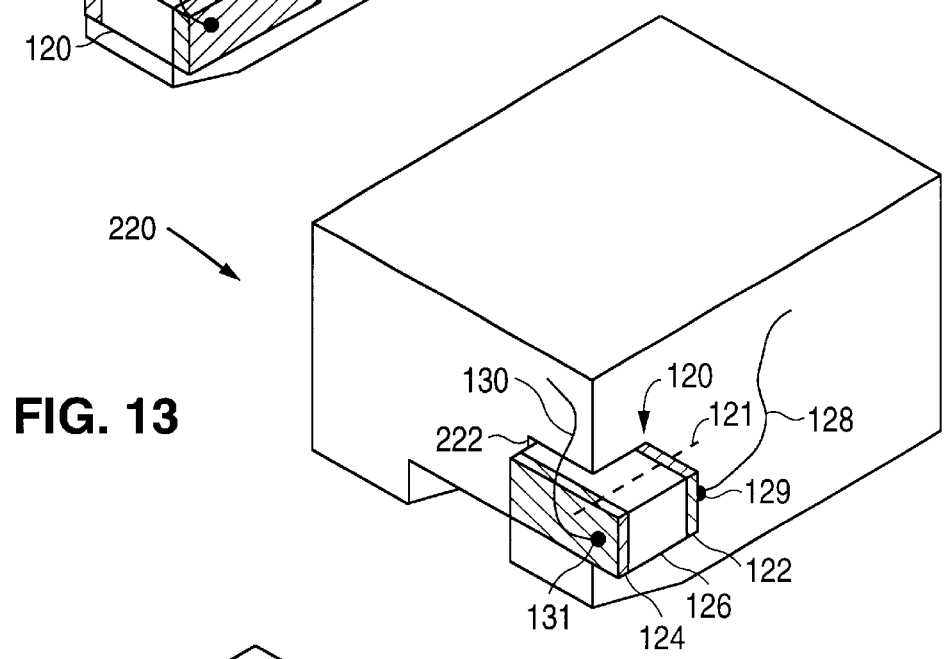
FIG. 13 shows is a perspective view of a glide head in accordance with another embodiment of the present invention.

FIG. 13 shows a perspective view of a glide head 220 in accordance with another embodiment of the present invention. Glide head 220 is similar to glide head 100, like designated elements being the same. However, glide head 220 includes a notch 222 that does not extend across the entire width of glide head 220. As shown in FIG. 13, notch 222 is large enough to accommodate transducer 120. Notch 222 may be formed in glide head 220, for example, by ion milling as is well understood by those of ordinary skill in the art.

Figure 14:
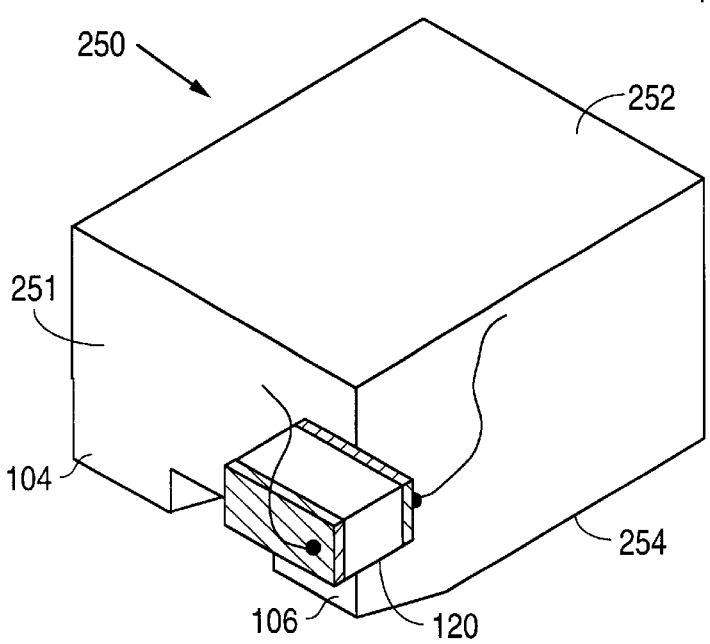
FIG. 14 shows a perspective view of a glide head in accordance with another embodiment of the present invention.

FIG. 14 is a perspective view of a glide head 250 in accordance with another embodiment of the present invention. Glide head 250 is similar to glide head 100, like designated elements being the same. Glide head 250, however, does not include a notch. Transducer 120 is mounted on the leading side 251 of glide head 250 without a notch using, e.g., epoxy. While glide head 250 does not have a notch, the height of glide head 250 must still be large enough to accommodate the thickness of transducer 120 without permitting transducer 120 to extend above top surface 252 or below bottom surface 254. Thus, the height of glide head 250 will be approximately the same as the height of glide head 100, described in reference to FIGS. 6, 7, and 8.

Figure 15:
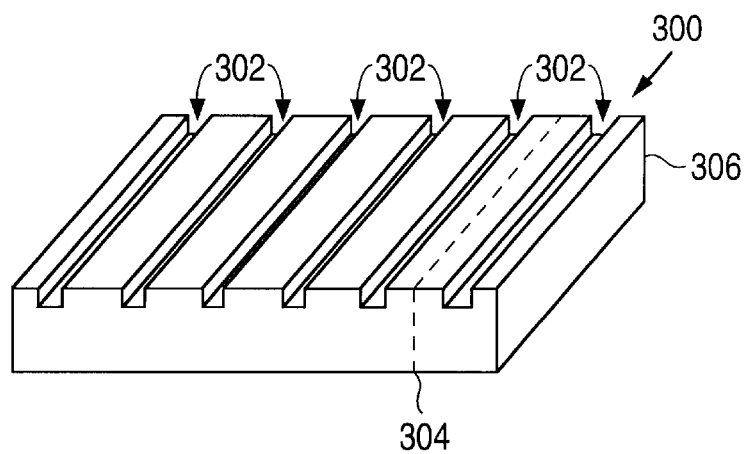
FIGS. 15 and 16 are perspective views showing various stages in the fabrication of multiple glide heads in accordance with an embodiment of the present invention.
Figure 16:
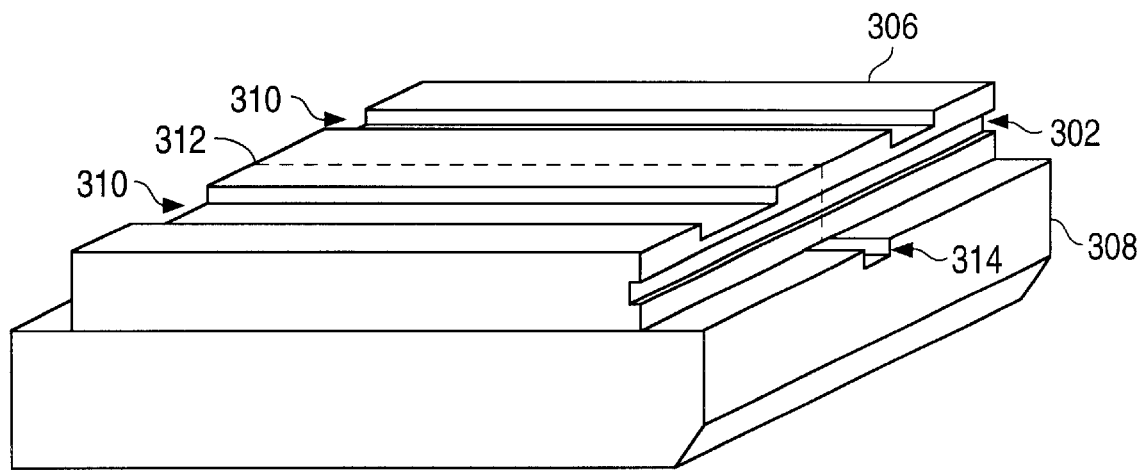

FIGS. 15 and 16 are perspective views showing various stages in the fabrication of multiple glide heads in accordance with an embodiment of the present invention. As shown in FIG. 15 a substrate 300 has a series of grooves 302 machined in it using conventional machining methods, for example, using a diamond impregnated blade, as is conventionally known.. Substrate 300 may be, for example, a wafer of aluminum oxide-titanium carbide such as material type no. 310, available from 3M Corporation located in Minnesota. Grooves 302 will be notch 102 in the finished glide head. Thus, each groove 302 is machined to the desired depth, e.g., 0.002 inches and is the desired width, e.g., 0.024 inches. The grooves 302 have a pitch of, e.g., 0.039, to accommodate the height $H_{100}$ of the finished glide head 100 as well as the material that is lost during slicing out each the rows. Multiple slices are then cut out of substrate 300 as indicated by dotted line 304, which produces slice 306.

Slice 306 is then polished on both sides so that the sides are parallel, which reduces variances caused by the machining process. The slice 306 is then bonded to a conventional transfer tool 308, which is used to hold slide 306 during subsequent processing. It should be understood that transfer tool 308 is much larger than slice 306. With slice 306 mounted on transfer tool 308, channels 310 are machined in slice 306 using conventional machining methods, etching, or any other appropriate technique. Individual glide heads are then cut out of slice 306 by cutting between channels 310, as indicated by dotted line 312. As shown in FIG. 16, the transfer tool 308 includes a groove 314 to accommodate the cutting tool so that the cutting tool does not become dulled by cutting into transfer tool 308. Channels 310 will be channel 112 that defines rails 104 and 106 in glide head 100, as shown in FIG. 6. The air bearing surfaces of the rails are polished flat, for example, using a lapping machine manufactured by LapMaster. The tapered leading end is then generated by placing the rails level on a polishing machine and setting the desired angle for the tapered leading end, e.g., fifty minutes. The tapered leading end is then formed by grinding.

The glide heads are debonded, cleaned, and inspected. The transducer is mounted in the notch 102, as shown in FIG. 8, and the glide head is mounted to the suspension arm. Thus, the processing of glide head 100 requires few additional processing steps over processing of conventional glide heads.

It should be understood that FIG. 16 shows only two glide heads being formed in slice 306 and that many more glide heads may be formed out of a slice, e.g., ten or more glide heads per slice. Further, the formation of grooves 302, channels 310 and other processes of forming a glide head are not limited to the use of conventional machining methods. For example, ion milling, as is well understood by those of ordinary skill in the art, may be used. Ion milling may be particularly advantageous where only partial grooves are desired, or if the rails are to have a non-linear shape.

Although the present invention is illustrated in connection with specific embodiments for instructional purposes, the present invention is not limited thereto. Various adaptations and modifications may be made without departing from the scope of the invention. For example, the slider material is not limited to aluminum oxide-titanium carbide. The slider surface may be coated with carbide by sputtering or other similar techniques to increase the durability of the slider. Different sizes and dimensions of the slider may be used. Different types of suspensions, and transducers other than piezoelectric crystals may be used. Further, in lieu of providing tapers, one can provide steps in the forward ends of the rails. Accordingly, all such changes come within our invention.

What is claimed is:

1. An apparatus for testing disk substrates for defects, the apparatus comprising:
   a glide head body having a top surface, a bottom surface, and at least one side surface having a notch; and
   a transducer mounted to a side surface of said glide head body with at least a portion of said transducer being mounted in said notch.

2. The apparatus of claim 1, wherein said side surface is a first side surface, said glide head body further comprising a second side surface, a third side surface, and fourth side surface, said notch being located on said first side surface and extending from said second side surface to said third side surface.

3. The apparatus of claim 1, wherein said notch is located approximately midway between said top surface and said bottom surface of said glide head body.

4. The apparatus of claim 1, wherein said side surface is the leading side of said glide head body.

5. The apparatus of claim 1, wherein said transducer is a piezoelectric transducer.

6. The apparatus of claim 5, wherein said piezoelectric transducer comprises a first collector and a second collector with a piezoelectric material disposed between said first collector and said second collector, said piezoelectric transducer mounted with said first collector against said glide head body.

7. The apparatus of claim 6, wherein said piezoelectric transducer is laterally mounted, such that an axis from said first collector to said second collector is orientated horizontally with respect to said glide head body.

8. The apparatus of claim 1, further comprising a suspension arm mounted to the top surface of said glide head body, wherein said transducer is mounted below said top surface and does not contact said suspension arm.

9. The apparatus of claim 1, wherein said glide head body has a height to length ratio of forty percent or greater.

10. A method of manufacturing a glide head, said method comprising:
   providing a substrate;
   producing at least one groove in said substrate;
   cutting said substrate into a slice, said slice having a top surface, a bottom surface, and four sides, wherein when said substrate is cut into a slice, said groove is on a side of said slice;
   producing multiple rails on said bottom surface of said slice;
   cutting individual glide head sliders out of said slice, said glide head sliders having a top surface, a bottom surface, and four sides; and
   mounting a transducer on one of said sides of a glide head slider by inserting said transducer at least partially in said groove.

11. The method of claim 10, further comprising mounting a suspension arm to said top surface of said glide head slider.

12. A glide head comprising:
   a glide head slider body having a top surface, a bottom surface, and four sides;
   a transducer; and
   a means for mounting said transducer to a side of said glide head slider body, said means for mounting comprising a notch on said side of said glide head slider body, said transducer being at least partially inserted into said notch.

13. The glide head of claim 12, wherein said bottom surface has at least two downwardly extending rails.

14. The glide head of claim 12, wherein said glide head slider body has a height to length ratio of forty percent or greater.

* * * * *